US012660851B2

(12) United States Patent
Bell et al.

(10) Patent No.: US 12,660,851 B2
(45) Date of Patent: Jun. 23, 2026

(54) CONTAINER FOR AEROSOLISABLE MATERIAL AND DEVICE USING THE SAME

(71) Applicant: NICOVENTURES TRADING LIMITED, London (GB)

(72) Inventors: Sally Bell, London (GB); Tatiana Betson, London (GB)

(73) Assignee: NICOVENTURES TRADING LIMITED, London (GB)

( * ) Notice: Subject to any disclaimer, the term of this patent is extended or adjusted under 35 U.S.C. 154(b) by 493 days.

(21) Appl. No.: 17/430,944

(22) PCT Filed: Dec. 20, 2019

(86) PCT No.: PCT/EP2019/086688
§ 371 (c)(1),
(2) Date: Aug. 13, 2021

(87) PCT Pub. No.: WO2020/164785
PCT Pub. Date: Aug. 20, 2020

(65) Prior Publication Data
US 2021/0386116 A1     Dec. 16, 2021

(30) Foreign Application Priority Data

Feb. 13, 2019     (GB) ..................................... 1901995

(51) Int. Cl.
*A24F 40/30*     (2020.01)
*A24B 15/14*     (2006.01)
(Continued)

(52) U.S. Cl.
CPC .............. *A24F 40/30* (2020.01); *A24B 15/14* (2013.01); *A24B 15/16* (2013.01); *A24B 15/167* (2016.11);
(Continued)

(58) Field of Classification Search
CPC .......... A24F 40/30; A24F 40/10; A24F 40/20; A24F 40/42; A24F 40/46; A24F 40/70;
(Continued)

(56) References Cited

U.S. PATENT DOCUMENTS 8,623,483  B1     1/2014  Pearcy et al.
9,999,258  B2     6/2018  Newcomb et al.
(Continued)

FOREIGN PATENT DOCUMENTS

CN     106990204  A  *  7/2017  ............. G01N 31/12
CN     206687159  U     12/2017
(Continued)

OTHER PUBLICATIONS

Guerqin et al., A new chapter in the bisphenol A story: Bisphenol S and bisphenol F are not safe alternatives to this compound, 2014, https://www.researchgate.net/publication/269173888_A_new_chapter_in_the_bisphenol_A_story_Bisphenol_S_and_bisphenol_F_are_not_safe_alternatives_to_this_compound (Year: 2014).*
(Continued)

*Primary Examiner* — Justin M Kratt
(74) *Attorney, Agent, or Firm* — Merchant & Gould P.C.

(57)     ABSTRACT

A device for generating an inhalable medium, the device comprising a container for holding a first aerosolizable material; a heater for volatilising the first aerosolizable material held in the container; a chamber for holding a second aerosolizable material, wherein internal surfaces of the chamber comprise a BPA-free, BPS-free copolyester plastic; and an outlet; wherein the device is configured such that in use, an inhalable medium is generated and passes through the outlet, the inhalable medium comprising components of the first and second aerosolizable materials in the form of a vapor and/or an aerosol.

21 Claims, 4 Drawing Sheets

(51) Int. Cl.

| | |
|---|---|
| *A24B 15/16* | (2020.01) |
| *A24B 15/167* | (2020.01) |
| *A24B 15/24* | (2006.01) |
| *A24F 40/10* | (2020.01) |
| *A24F 40/20* | (2020.01) |
| *A24F 40/42* | (2020.01) |
| *A24F 40/46* | (2020.01) |
| *A24F 40/70* | (2020.01) |
| *C08L 67/00* | (2006.01) |
| *A24B 15/10* | (2006.01) |
| *A24F 40/40* | (2020.01) |
| *C08L 67/02* | (2006.01) |

(52) U.S. Cl.
 CPC ............ *A24B 15/243* (2013.01); *A24F 40/10* (2020.01); *A24F 40/20* (2020.01); *A24F 40/42* (2020.01); *A24F 40/46* (2020.01); *A24F 40/70* (2020.01); *C08L 67/00* (2013.01); *A24B 15/10* (2013.01); *A24F 40/40* (2020.01); *C08L 67/02* (2013.01)

(58) Field of Classification Search
 CPC ......... A24F 40/40; A24B 15/14; A24B 15/16; A24B 15/167; A24B 15/243; A24B 15/10; C08L 67/00; C08L 67/02
 See application file for complete search history.

(56) References Cited

U.S. PATENT DOCUMENTS

| | | | |
|---|---|---|---|
| 2017/0025727 A1 | 1/2017 | Yang et al. | |
| 2017/0152075 A1 | 6/2017 | Moritz et al. | |
| 2017/0251727 A1 | 9/2017 | Nielsen | |
| 2018/0117269 A1 | 5/2018 | Suzuki et al. | |
| 2018/0148237 A1* | 5/2018 | Sibley ............... | B65D 17/4011 |
| 2018/0238317 A1 | 8/2018 | Ward et al. | |
| 2018/0255833 A1* | 9/2018 | Nicolas .................. | A24F 40/42 |
| 2020/0163377 A1* | 5/2020 | Franke .................... | A24C 5/01 |

FOREIGN PATENT DOCUMENTS

| | | | | |
|---|---|---|---|---|
| EP | 1951074 B1 * | 7/2014 | ............. | A24B 15/24 |
| JP | 849118575 A | 11/1974 | | |
| JP | 2001233334 A | 8/2001 | | |
| JP | 2016500740 A | 1/2016 | | |
| JP | 2018201514 A | 12/2018 | | |
| JP | 2019501034 A | 1/2019 | | |
| JP | 2019501772 A | 1/2019 | | |
| RU | 2620491 C2 | 5/2017 | | |
| WO | 2013098405 A2 | 7/2013 | | |
| WO | 2013159245 A1 | 10/2013 | | |
| WO | WO2015082651 | 6/2015 | | |
| WO | 2016135959 A1 | 9/2016 | | |
| WO | WO2020039391 | 2/2020 | | |

OTHER PUBLICATIONS

International Search Report and Written Opinion for PCT/EP2019/086688 date mailed Jul. 7, 2020.
Wikipedia, "Health Effects of Bisphenol A" https://en.wikipedia.org/wiki/Health_effects_of_Bisphenol_A as accessed on Aug. 12, 2021.
Wikipedia, "Bisphenol S", https://en.wikipedia.org/w/index.php?title=Bisphenol S&oldid=859950917 as accessed on Aug. 12, 2021.
Greenbox Bionatic: "Bioplastics- The Eco-Friendly Alternative" https://www.biologischverpacken.de/en/ bioplastics as accessed on Aug. 12, 2021.
Decision to Grant received for Japanese Patent Application No. 2021-545884, mailed on Mar. 28, 2023, 5 Pages (2 pages of English Translation and 3 pages of Official Copy Only).
International Preliminary Report on Patentability received for PCT Patent Application No. PCT/EP2019/086688, mailed on Aug. 26, 2021, 12 pages.
Invitation to Pay Additional Fees received for PCT Patent Application No. PCT/EP2019/086688, mailed on May 13, 2020, 11 pages.
Office Action received for Canadian Patent Application No. 3125374, mailed on Oct. 3, 2022, 7 pages.
Office Action received for Russian Patent Application No. 2021122477, mailed on Feb. 15, 2022, 7 pages.
Reason for Refusal received for Japanese Patent Application No. 2021-545884, mailed on Sep. 27, 2022, 10 pages (5 pages of English Translation and 5 pages of Official Copy Only).
Search Report received for Japanese Patent Application No. 2021-545884, mailed on Sep. 8, 2022, 18 pages (9 pages of English Translation and 9 pages of Official Copy Only).

* cited by examiner

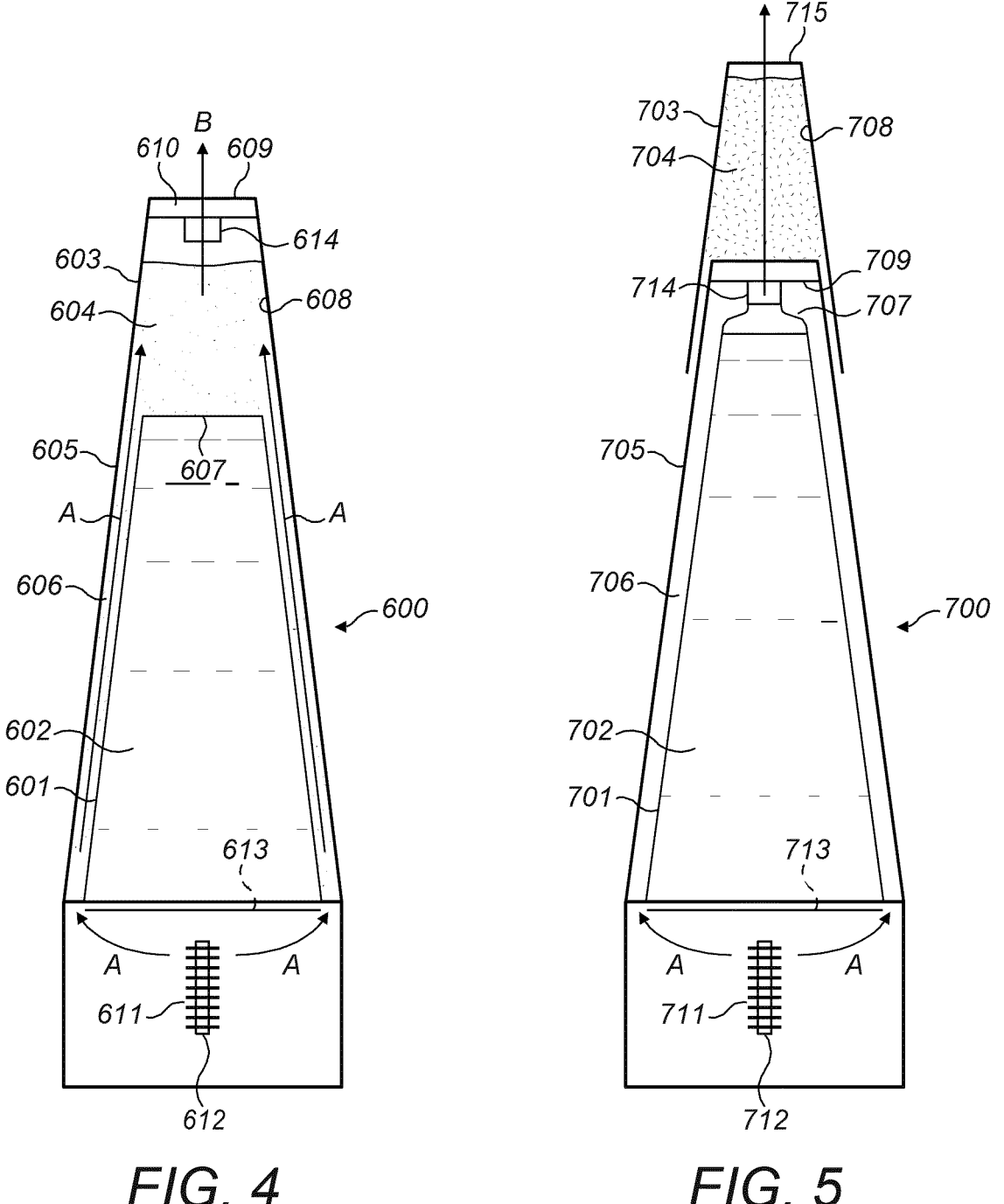
FIG. 4                    FIG. 5

CONTAINER FOR AEROSOLISABLE MATERIAL AND DEVICE USING THE SAME

PRIORITY CLAIM

The present application is a National Phase entry of PCT Application No. PCT/EP2019/086688, filed Dec. 20, 2019 which claims priority from GB Patent Application No. 1901995.9 filed Feb. 13, 2019, each of which is hereby fully incorporated herein by reference.

TECHNICAL FIELD

The present invention relates, without limitation, to a device for generating an inhalable medium, a cartridge for use in a device for generating an inhalable medium, a tobacco container, and a kit.

BACKGROUND

Smoking articles such as cigarettes, cigars and the like burn tobacco during use to create tobacco smoke. Alternatives to these types of articles, release compounds without burning to form an inhalable medium.

Examples of such products are heating devices include e-cigarette/heat-not-burn hybrid devices, also known as electronic tobacco hybrid devices. These hybrid devices contain a liquid which is vaporized by heating to produce an inhalable vapor or aerosol. The liquid may contain flavorings and/or aerosol-generating substances, such as glycerol and in some instances, nicotine. The vapor or aerosol passes through material in the device and entrains one or more constituents of a substrate material to produce the inhaled medium. The substrate material may be, for example, tobacco, other non-tobacco products or a combination, such as a blended mix, which may or may not contain nicotine.

SUMMARY

A first aspect of the present disclosure provides a device for generating an inhalable medium, the device comprising:
    a container for holding a first aerosolizable material;
    a heater for volatilizing the first aerosolizable material held in the container;
    a chamber for holding a second aerosolizable material, wherein internal surfaces of the chamber comprise a Bisphenol A (BPA)-free, Bisphenol S (BPS)-free copolyester plastic; and
    an outlet;
    wherein the device is configured such that in use, an inhalable medium is generated and passes through the outlet, the inhalable medium comprising components of the first and second aerosolizable materials in the form of a vapor and/or an aerosol.

The device described herein may be referred to as an electronic tobacco hybrid device. In some cases, the first aerosolizable material may be a liquid or gel, suitably a liquid. In some cases, the second aerosolizable material may be a solid or gel, suitably a nicotine containing solid, such as tobacco.

A second aspect of the disclosure provides a tobacco container wherein the tobacco-contacting surface comprises a BPA-free, BPS-free copolyester plastic. Suitably, the container may be adapted for use in the device for generating an inhalable medium described herein.

A third aspect of the disclosure provides a cartridge for use in a device for generating an inhalable medium, the cartridge comprising a first aerosolizable material in a container and a second aerosolizable material in a chamber, wherein internal surfaces of the chamber comprise a BPA-free, BPS-free copolyester plastic. Suitably, the cartridge may be adapted for use in the device for generating an inhalable medium described herein.

A further aspect of the disclosure provides a kit comprising
    (i) a liquid pod containing an aerosolizable liquid; and
    (ii) a tobacco container according to the second aspect of the disclosure, containing tobacco;
    wherein the liquid pod and tobacco container are configured for use in a device for use in generating an inhalable medium, the device being such that in use, an inhalable medium is generated, the medium comprising (i) volatilized liquid from the liquid pod in the form of a vapor and/or an aerosol and (ii) one or more constituents of the tobacco composition.

A further aspect of the disclosure provides for the use of a BPA-free, BPS-free copolyester plastic as the tobacco-contacting surface in a tobacco container, to reduce nicotine losses from the tobacco.

In some cases, the device, cartridge or tobacco container is configured such that in use, a first aerosolizable material is volatilized by the heater and passes, in the form of at least one of a vapor and an aerosol, through the second aerosolizable material to thereby entrain one or more constituents from the second aerosolizable material and produce the inhalable medium which passes out of the outlet.

To the extent that they are compatible, features described in relation to one aspect of the disclosure are explicitly disclosed in combination with each and every other aspect. For instance, features described in relation to the device, cartridge, tobacco container kit are explicitly disclosed in combination with the each of the others of the device, cartridge, tobacco container and kit. Specifically, features of the aerosolizable materials, and the BPA-free, BPS-free copolyester plastic material discussed herein are explicitly disclosed in combination with the device, cartridge, container and kit embodiments of the disclosure. Similarly, features described in relation to apparatus are explicitly disclosed in combination with method and use aspects of the disclosure, and vice versa.

Further features and advantages of the disclosure will become apparent from the following description of preferred embodiments of the disclosure, given by way of example only, which is made with reference to the accompanying drawings.

BRIEF DESCRIPTION OF THE DRAWINGS

Examples of devices, cartridges and tobacco containers for generating an inhalable medium according to the disclosure are described below with reference to the accompanying drawings, in which:

FIG. 4 shows a schematic longitudinal cross-sectional view of an example of a cartridge having a liquid container and an integral container for solid material; and.

FIG. 5 shows a schematic longitudinal cross-sectional view of an example of a cartridge having a liquid container and a detachable container for solid material.

DETAILED DESCRIPTION

Figure 1:
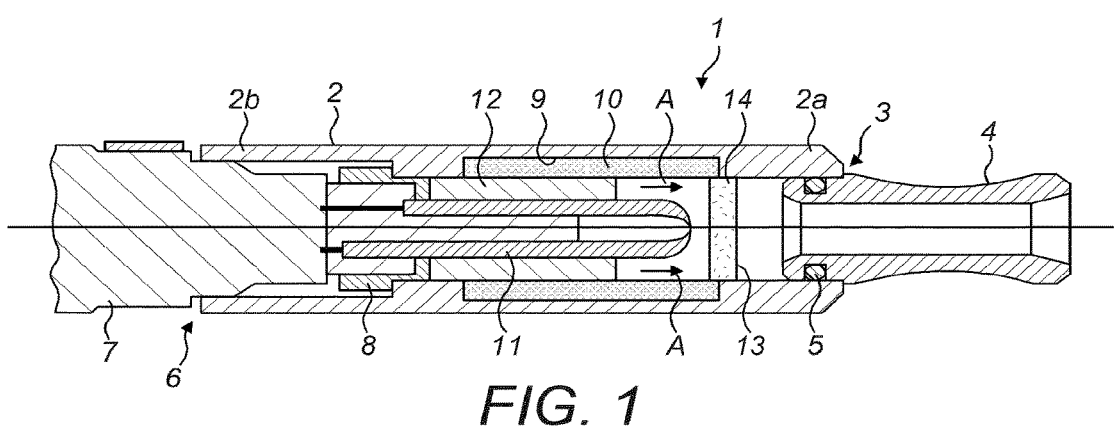
FIG. 1 shows a schematic longitudinal cross-sectional view of an example of a device for generating an inhalable medium.

Tobacco can be treated with base and water in order to ease liberation of nicotine from the tobacco. Nicotine is liberated from nicotine salts in tobacco by reaction with the base. Nicotine is then volatilized at a lower temperature in use.

The present disclosure relates to improving the nicotine delivery from a hybrid device. The inventors have established that in known devices, nicotine losses from tobacco prior to use are significant; without wishing to be bound by theory, it is believed that the volatile nicotine is absorbed into the walls of the container holding the tobacco. In particular, base treated nicotine may be included in known devices (where the pH treatment liberates nicotine from salt form); free nicotine is more volatile so is more readily entrained in the aerosol in use, but this increase in volatility has been seen to result in an increase in nicotine losses prior to use.

The inventors have also established that plastic components used in known tobacco containers may leach components into tobacco.

The present disclosure relates to the use of a BPA-free, BPS-free copolyester plastic in a tobacco-contacting surface. This has been found to minimize leaching of plastic components into the tobacco. Such plastics have also been found to minimize nicotine losses from the tobacco, particularly from base-treated tobacco.

As noted above, a first aspect of the disclosure provides a device for generating an inhalable medium, the device comprising:

a container for holding a first aerosolizable material;
  a heater for volatilizing the first aerosolizable material held in the container;
  a chamber for holding a second aerosolizable material, wherein internal surfaces of the chamber comprise a BPA-free, BPS-free copolyester plastic; and
  an outlet;
  wherein the device is configured such that in use, an inhalable medium is generated and passes through the outlet, the inhalable medium comprising components of the first and second aerosolizable materials in the form of a vapor and/or an aerosol.

The device described herein may be referred to as an electronic tobacco hybrid device. In some cases, the first aerosolizable material may be a liquid or gel, suitably a liquid. In some cases, the second aerosolizable material may be a solid or gel, suitably a nicotine containing solid, such as tobacco.

In some cases, the internal surfaces of the chamber are formed from (i.e. substantially consist of or consist of) a BPA-free, BPS-free copolyester plastic. In some cases the chamber is formed from walls consisting of a BPA-free, BPS-free copolyester plastic.

In some cases, the copolyester plastic comprises monomers selected from:

(i) di-methylterephthalate (DMT);
  (ii) 1,4-cyclohexanedimethanol (CHDM); and
  (iii) 2,2,4,4-tetramethyl-1,3-cyclobutanediol (TMCD).

In some cases, the copolyester plastic comprises each of the following monomers:

(i) di-methylterephthalate (DMT);
  (ii) 1,4-cyclohexanedimethanol (CHDM); and
  (iii) 2,2,4,4-tetramethyl-1,3-cyclobutanediol (TMCD).

In some cases, the copolyester plastic is formed from (i.e. substantially consists of or consist of) the following monomers:

(i) di-methylterephthalate (DMT);
  (ii) 1,4-cyclohexanedimethanol (CHDM); and
  (iii) 2,2,4,4-tetramethyl-1,3-cyclobutanediol (TMCD).

In some cases, the device includes a first aerosolizable material in the container and a second aerosolizable material in the chamber.

In some cases, the first aerosolizable material comprises a liquid or gel. In some particular cases, the first aerosolizable material does not comprise nicotine. The first aerosolizable material may suitably be a liquid that comprises an aerosol generating agent such as glycerol or propylene glycol. It may additionally comprise a flavorant and/or water. Generally, suitable liquids include those conventionally used in e cigarette devices. The liquid is typically volatilized at around 150-250° C.

In some cases, the second aerosolizable material comprises nicotine. In some cases, the second aerosolizable material comprises tobacco material. In some particular cases, the second aerosolizable material comprises a tobacco material having a pH of greater than 7, suitably greater than 8, and suitably in the range of 8 to 10. The tobacco pH may be raised by treatment with any suitable base including, for example, hydroxides, carbonates and bicarbonates of sodium, potassium and calcium, and mixtures thereof. In some cases, the tobacco material may be porous, such that an aerosol or vapor can pass through the tobacco material. Thus, components of the tobacco material are efficiently entrained in the aerosol/vapor as it passes through the tobacco material.

As used herein, the term "tobacco material" refers to any material comprising tobacco or derivatives therefore. The term "tobacco material" may include one or more of tobacco, tobacco derivatives, expanded tobacco, reconstituted tobacco or tobacco substitutes. The tobacco material may comprise one or more of ground tobacco, tobacco fiber, cut tobacco, extruded tobacco, tobacco stem, reconstituted tobacco, agglomerated tobacco, spheronised tobacco and/or tobacco extract.

The tobacco used to produce tobacco material may be any suitable tobacco, such as single grades or blends, cut rag or whole leaf, including Virginia and/or Burley and/or Oriental. It may also be tobacco particle 'fines' or dust, expanded tobacco, stems, expanded stems, and other processed stem materials, such as cut rolled stems. The tobacco material may be a ground tobacco or a reconstituted tobacco material. The reconstituted tobacco material may comprise tobacco fibers, and may be formed by casting, a Fourdrinier-based paper making-type approach with back addition of tobacco extract, or by extrusion.

The second aerosolizable material may additionally comprise flavorings and/or aerosol generating agents and/or casings. Suitable casings include invert sugar, molasses, cane sugar, honey, cocoa, liquorice, polyols such as glycerol and propylene glycol and acids such as malic acid.

The device according to some examples of the disclosure may be configured such that in use, a first aerosolizable material is volatilized by the heater and passes, in the form of at least one of a vapor and an aerosol, through the second aerosolizable material to thereby entrain one or more constituents from the second aerosolizable material and produce the inhalable medium which passes out of the outlet.

In other examples, the flow path from the container holding the first aerosolizable material may be combined with a separate flow path which runs from the second aerosolizable material so as to form the inhalable medium. In other words, in some example devices, the aerosol/vapor formed by volatilizing the first aerosolizable material does not pass through the chamber retaining the second aerosolizable material.

In some cases, the device comprises means for heating the second aerosolizable material to volatilize components of the tobacco and form a first aerosol and/or vapor. The first aerosolizable material may be volatilized to form a second vapor and/or aerosol, which may be combined with the first vapor and/or aerosol to form the inhalable medium. In some cases, one heater may heat both of the aerosolizable materials. In some cases, the device may be configured such that the heater only heats the first aerosolizable material directly and the second aerosolizable material is heated by warmth carried in the vapor/aerosol formed from the volatilized first material (thereby volatilizing components of the second material which are then entrained in the vapor/aerosol flow).

In an embodiment, the device comprises a cooler or cooling zone downstream of the heater and upstream of the chamber, the cooler or cooling zone being arranged to cool vaporized components of the first aerosolizable material to form an aerosol of liquid droplets which in use passes through the second aerosolizable material in the chamber. The cooler may be arranged in effect to act as a heat exchanger, allowing for recovery of heat from the vapor. The recovered heat can be used for example to pre-heat the second aerosolizable material and/or to assist in heating the first material.

In an embodiment, the device comprises a second heater for heating the second aerosolizable material in the chamber. This enables the second aerosolizable material to be heated by the heater, which encourages release of compounds from the material, and optionally allows a lower temperature to be used for the heated first aerosolizable material.

In an embodiment, the device is battery-operated.

In an embodiment, the or each heater is an electrically resistive heater.

In an embodiment, the container for the first aerosolizable material is removable. The container may be in the form of a pot or the like (which in some embodiments may be annular for example), and/or an absorbent wadding or the like. The whole container containing the first aerosolizable material may in effect be a disposable item which is replaced as a whole after use. As an alternative, the arrangement may be such that the user removes the container from the device, replaces used material or tops up the material in the container, and then places the container back in the device.

In some cases, the container for the first aerosolizable material may be non-removable from the device. In such an embodiment, the user may just replace used material or top up the material in the container after use as necessary.

In some cases, the container for the first aerosolizable material and the chamber for the second aerosolizable material are an integral unit. In some cases, the integral unit is a cartridge that can be removed from the device. As noted above, an aspect of the disclosure provides such a cartridge.

In some cases, the chamber is removable from the device. The chamber may be, for example, in the form of a container or pod or the like which contains the second aerosolizable material before use. The chamber containing the second aerosolizable material may in effect be a disposable item which is replaced as a whole after use. As an alternative, the arrangement may be such that the user removes the chamber from the device, replaces used material, and then places the chamber back in the device. A removable chamber of this type may be referred to as a tobacco container, and is a further aspect of the disclosure.

Examples of cartridges, tobacco containers and devices for generating an inhalable medium according to the some embodiments of the disclosure will now be described, with reference to the accompanying drawings.

Referring to FIG. 1, there is shown an example of a device 1 for generating an inhalable medium. In broad outline, the device 1 volatilizes a liquid to form a vapor or an aerosol which passes through a material so as to produce an inhalable medium that contains one or more constituents derived from the material.

In this respect, first it may be noted that, in general, a vapor is a substance in the gas phase at a temperature lower than its critical temperature, which means that for example the vapor can be condensed to a liquid by increasing its pressure without reducing the temperature. On the other hand, in general, an aerosol is a colloid of fine solid particles or liquid droplets, in air or another gas. A "colloid" is a substance in which microscopically dispersed insoluble particles are suspended throughout another substance.

Returning to FIG. 1, the device 1 of this example has a generally hollow cylindrical outer housing 2. The housing 2 has an open end 3. In this example, a tubular mouthpiece 4 is provided in the open end 3. The mouthpiece 4 in this example is removable by a user from the housing 2. An O-ring or other seal 5 assists in sealing the mouthpiece 4 in the housing 2. At or towards the other end 6 of the housing 2 is a battery 7 for powering various components of the device 1, as will be discussed further below. The battery 7 may be a rechargeable battery or a disposable battery. A controller 8 is also provided in the housing 2 for controlling the operation of various components of the device 1, as will be discussed further below.

The housing 2 has a container 9 for holding or containing a liquid 10. Various different forms for the container 9 may be used. In the example of FIG. 1, the container 9 is in the form of an annular chamber 9 provided in the housing 2 between the open end 3 and the other end 6. In this particular example, the housing 2 is in two parts, a first part 2a being towards the open end 3 and a second part 2b towards the other end 6. The first and second parts 2a,2b of the housing 2 may connect to each other via a screw thread, a bayonet fitting or the like. In use, a user can separate the first and second parts 2a,2b of the housing 2 to allow the liquid 10 to be replenished or replaced as necessary. Alternatively, the mouthpiece 4 can be removed to provide access to the container 9. It will be understood however that other arrangements are possible. For example, the liquid 10 may be provided in a discrete annular pot-like container which can be removed as a whole from the housing 2. Such a discrete container may be disposable so that the user replaces the liquid 10 by fitting a new container with liquid 10 in the housing 2. Alternatively, such a container may be reusable. In such a case, the user may replenish or replace liquid 10 in the container whilst it has been removed from the housing 2 and then replace the refilled container in the housing 2. It will be understood that the housing 2 need not be in two parts and that other arrangements enabling access for the user may be provided, for example, to enable refilling in situ.

A heater 11 is provided generally centrally of the housing 2, that is, centrally along the length and width of the housing 2 in this example. In this example, the heater 11 is powered by the battery 7 and is therefore electrically connected to the battery 7. The heater 11 may be an electrically resistive heater, including for example a nichrome resistive heater, a ceramic heater, etc. The heater 11 may be for example a wire, which may for example be in the form of a coil, a plate (which may be a multi-layer plate of two or more different materials, one or more of which may be electrically conductive and one or more of which may be electrically non-conductive), a mesh (which may be woven or non-woven for example, and which again may be similarly multi-layer), a film heater, etc. Other heating arrangements may be used, including non-electrical heating arrangements.

This heater 11 is provided for volatilizing the liquid 10. In the example shown, an annular wick 12 surrounds the heater 11 and is in (thermal) contact with the heater 11. The outermost surface of the annular wick 12 is in contact with liquid 10 contained in the liquid container 9. The wick 12 is generally absorbent and acts to draw in liquid 10 from the liquid container 9 by capillary action. The wick 12 is preferably non-woven and may be for example a cotton or wool material or the like, or a synthetic material, including for example polyester, nylon, viscose, or the like. The wick may alternatively be a ceramic or metallic material. Whilst this will be described more fully below, it may be noted here that in use, liquid 10 drawn into the wick 12 is heated by the heater 11. The liquid 10 may be volatilized so as to produce an aerosol of liquid droplets or sufficiently heated to produce a vapor. The aerosol or vapor so produced exits the wick 12 and passes towards the mouthpiece 4 as shown by the arrows A under the action of the user drawing on the mouthpiece 4. The heater 11 and wick 12 may be provided as a single, effectively integral item, sometimes referred to as an "atomizer", such that the heating and wicking is effectively carried out by a single unit.

The housing 2 further contains a chamber 13, which holds or contains a tobacco composition 14 in the device 1. The tobacco-contacting surfaces of the chamber 13 are formed from a copolyester plastic as discussed herein.

In use, a user can access the chamber 13 to replace or replenish the tobacco composition 14 through the open end 3 of the housing 2 by removing the mouthpiece 4 and/or by separating the two parts 2a,2b of the housing 2. Various different forms for the chamber 13 may be used. For example, the chamber 13 may each be a tube which is completely open at both ends and which contains the tobacco composition 14. As another example, the chamber 13 may each be a tube which has one or more end walls which have through holes through which a vapor or aerosol can pass. The chamber 13 may remain in situ within the housing 2 whilst the user removes and replaces the tobacco composition 14. Alternatively, the chamber 13 containing the tobacco composition 14 may be a discrete item which in use is inserted into and removed from the housing 2 as a whole. Removable chambers 13 of this type may be disposable so that the user replaces the tobacco composition 14 by fitting a new chamber 13 containing fresh tobacco composition into the housing 2. As an alternative, the chamber 13 may be reusable. In such a case, the user may replace the tobacco composition 14 in the chamber 13 whilst the chamber has been removed from the housing 2 and then replace the refilled chamber 13 in the housing 2. In yet another example, the chamber 13 may comprise clips or the like provided internally of the housing 2 and which retain the tobacco composition in position. In some examples, the tobacco composition simply fits snugly within the chamber 13. As another alternative, the container 9 for containing the liquid 10 may itself be arranged to support or carry the tobacco composition 14a,14b. For example, the container 9 may have one or more clips or a tube or the like for receiving and holding the tobacco composition 14 in position. Such a dual function container 9/chamber or receptacle 13 for both containing the liquid 10 and receiving the tobacco composition 14 may be in the form of a cartridge or the like and may be a disposable item or may be re-useable, with the liquid 10 and tobacco composition 14 being replaced or topped up by the user as required. In some cases, it may be that the user only needs to top up or replace the tobacco composition 14 from time to time, with sufficient liquid 10 being provided for several uses. Once the liquid 10 has been consumed, the user disposes of the dual function container 9/receptacle 13a,13b and uses a new one. Likewise, it may be that the user only needs to top up or replace the liquid 10 from time to time, with sufficient tobacco composition being provided for several uses. Once the tobacco composition has been consumed, the user disposes of the dual function container 9/receptacle 13a,13b and uses a new one. Specific examples of dual function containers/receptacles are discussed further below.

The tobacco composition 14 is located in the housing 2 downstream of the location where the aerosol or vapor is produced from the liquid 10 and upstream of the open end 3 of the housing 2 and the mouthpiece 4. In this particular example, the tobacco composition 14 is effectively provided in the same portion or chamber of the housing 2 as the wick 12. The aerosol or vapor produced from the liquid 10 exits the wick 12 and passes as shown by the arrows A towards the tobacco composition 14 under the action of the user drawing on the mouthpiece 4. In particular embodiments, the tobacco composition is porous so that the aerosol or vapor passes through the tobacco composition and then through the open end 3 of the housing 2 and the mouthpiece 4. The heat carried by the aerosol or vapor enhances volatilization of nicotine and other volatiles from the tobacco composition, which are then entrained in the passing vapor/aerosol.

In some embodiments, the tobacco composition 14 and/or their chamber 13 is arranged so that there is no air gap between the tobacco composition/chamber and the interior of the housing 2 so that the aerosol or vapor flows entirely through the tobacco composition.

The liquid 10 is suitably a liquid that is volatilizable at reasonable temperatures, preferably in the range of 100-300° C. or more particularly around 150-250° C., as that helps to keep down the power consumption of the device 1. Suitable materials include those conventionally used in e-cigarette devices, including for example propylene glycol and glycerol (also known as glycerin).

The tobacco composition 14 imparts a flavor to the aerosol or vapor produced from the liquid 10 as the aerosol or vapor passes over or through it. As the aerosol or vapor passes through and over the tobacco composition 14, the hot aerosol or vapor entrains organic and other compounds or constituents from the material that lend tobacco its organoleptic properties, thus imparting the flavor to the aerosol or vapor as it passes to the mouthpiece 4.

The device 1 provides nicotine for the user. The nicotine may be provided in the liquid, may be obtained from the tobacco composition, may be provided as a coating or the like on the tobacco composition, or any combination of these. In some cases, the liquid does not comprise nicotine. Likewise, flavorings may be added to the tobacco composition and/or to the liquid.

In the example shown in FIG. 1, the only heat source for heating the tobacco composition 14 in the device 1, which is required so as to generate the organic and other compounds or constituents from the tobacco composition, is the hot aerosol or vapor produced from heating the liquid 10.

Figure 2:
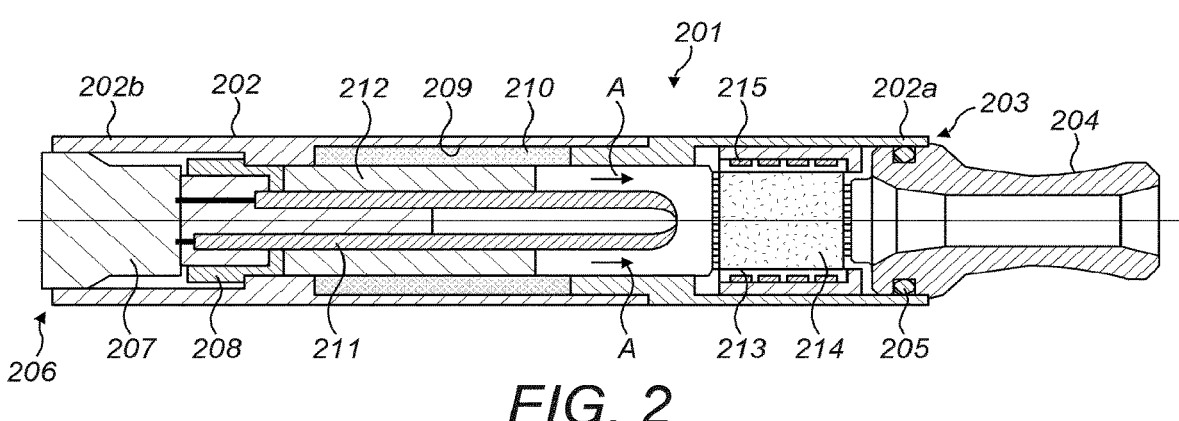
FIG. 2 shows a schematic longitudinal cross-sectional view of another example of a device for generating an inhalable medium.

Referring now to FIG. 2, there is shown another example of a device for generating an inhalable medium. In the following description and in FIG. 2, components and features that are the same as or similar to the corresponding components and features of the example described with reference to FIG. 1 have the same reference numeral but increased by 200. For the sake of brevity, the description of those components and features will not be repeated in its entirety here. It will be understood that the arrangements and alternatives, etc. described above in relation to the example of FIG. 1 are also applicable to the example of FIG. 2. Again, in broad outline, the device 201 of FIG. 2 heats a liquid to form a vapor or an aerosol which passes through a tobacco composition 214 so as to produce an inhalable medium that contains one or more constituents derived from the tobacco composition.

The device 201 of this example has a generally hollow cylindrical outer housing 202 with an open end 203 and a tubular mouthpiece 204. The mouthpiece 204 in this example is removable by a user from the housing 202 and an O-ring or other seal 205 assists in sealing the mouthpiece 204 in the housing 202. A battery 207 for powering various components of the device 201 and a controller 208 are provided at or towards the other end 206 of the housing 202. The housing 202 of this example is in two parts, a first part 202*a* being towards the open end 203 and a second part 202*b* towards the other end 206.

The housing 202 has a container 209 for holding or containing a liquid 210. The container 209 may be of any of the types described above in relation to the example of FIG. 1. A heater 211 is provided generally centrally (lengthwise and widthwise) of the housing 202 for volatilizing the liquid 210. In this example, the heater 211 is powered by the battery 207 and is therefore electrically connected to the battery 207. The heater 211 may be an electrically resistive heater, a ceramic heater, etc. The heater 211 may be for example a wire, which may for example be in the form of a coil, a plate (which may be a multi-layer plate of two or more different materials, one or more of which may be electrically conductive and one or more of which may be electrically non-conductive), a mesh (which may be woven or non-woven for example, and which again may be similarly multi-layer), a film heater, etc. Other heating arrangements may be used, including inductive heating arrangements or non-electrical heating arrangements. An annular wick 212 surrounds the heater 211 and is in (thermal) contact with the heater 211. The outermost surface of the annular wick 212 is in contact with liquid 210 contained in the liquid container 209. The liquid 210 may be heated so as to produce an aerosol of liquid droplets or sufficiently heated to produce a vapor. The aerosol or vapor so produced exits the wick 212 and passes towards the mouthpiece 204 as shown by the arrows A under the action of the user drawing on the mouthpiece 204. The heater 211 and wick 212 may be provided as a single, effectively integral item such that the heating and wicking is effectively carried out by a single unit.

The housing 202 further contains a chamber 213 which holds or contains a tobacco composition 214 in the device 201. The tobacco-contacting surfaces of the chamber 213 are formed from a copolyester plastic as discussed herein.

The chamber 213 may be of any of the types described above in relation to the example of FIG. 1. The tobacco composition 214 are located in the housing 202 downstream of the location where the aerosol or vapor is produced from the liquid 210 and upstream of the open end 203 of the housing 202 and the mouthpiece 204. In this particular example, the tobacco composition 214 is effectively provided in the same portion or chamber of the housing 202 as the wick 212. The aerosol or vapor produced from the liquid 210 exits the wick 212 and passes as shown by the arrows A towards the tobacco composition under the action of the user drawing on the mouthpiece 204. In particular embodiments, the tobacco composition 214 is porous so that the aerosol or vapor passes through the tobacco composition and then through the open end 203 of the housing 202 and the mouthpiece 204. The heat carried by the aerosol or vapor volatilizes nicotine and other volatiles from the tobacco composition, which are then entrained in the passing vapor/aerosol.

In some embodiments, the tobacco composition 214 and/or the chamber 213 is arranged so that there is no air gap between the tobacco composition/chamber and the interior of the housing 202 so that the aerosol or vapor flows entirely through the tobacco composition. As the aerosol or vapor passes through and over the tobacco composition 214, the hot aerosol or vapor entrains organic and other compounds or constituents from the tobacco composition that lend tobacco its organoleptic properties, thus imparting the flavor to the aerosol or vapor as is passes to the mouthpiece 204.

In the example device 201 of FIG. 2, a second heater 215, such as an oven heater, is provided in thermal contact with the tobacco composition 214 to pre-heat the tobacco composition and/or provide additional heat to the tobacco composition throughout use of the device 201. This encourages release of constituents from the tobacco composition as the vapor or aerosol passes through/over the tobacco composition in use. The amount of heated liquid 210 to achieve desirable heating of the tobacco composition may be reduced. The second heater 215 may be an electrically resistive heater, a ceramic heater, etc., powered by for example the battery 207. The second heater 215 may be for example a wire, which may for example be in the form of a coil, a plate (which may be a multi-layer plate of two or more different materials, one or more of which may be electrically conductive and one or more of which may be electrically non-conductive), a mesh (which may be woven or non-woven for example, and which again may be similarly multi-layer), a film heater, etc. The second heater 215 may be an inductive heater powered by for example the battery 207. Tobacco composition 214 may include materials susceptible to inductive heating. Other heating arrangements may be used for the second heater 215, including non-electrical heating arrangements.

The heater 215 may also effect volatilization of the nicotine or other volatiles from the tobacco composition 214.

In the example device 201 of FIG. 2, the heater 215 for heating the tobacco composition is provided externally of the tobacco composition and heats the tobacco composition by heat conduction from the exterior of the tobacco composition. The heater 215 in this example is generally cylindrical. The heater 215 may in effect be an integral part of the device 201 and be provided as part of the housing 202. As an alternative, the heater 215 may be provided integrally with the chamber 213 which holds or contains the tobacco composition 214. In this alternative, in the case that the chamber 213 is disposable, the heater 215 will be replaced when a new chamber with fresh tobacco is loaded into the device 201 by the user.

Figure 3:
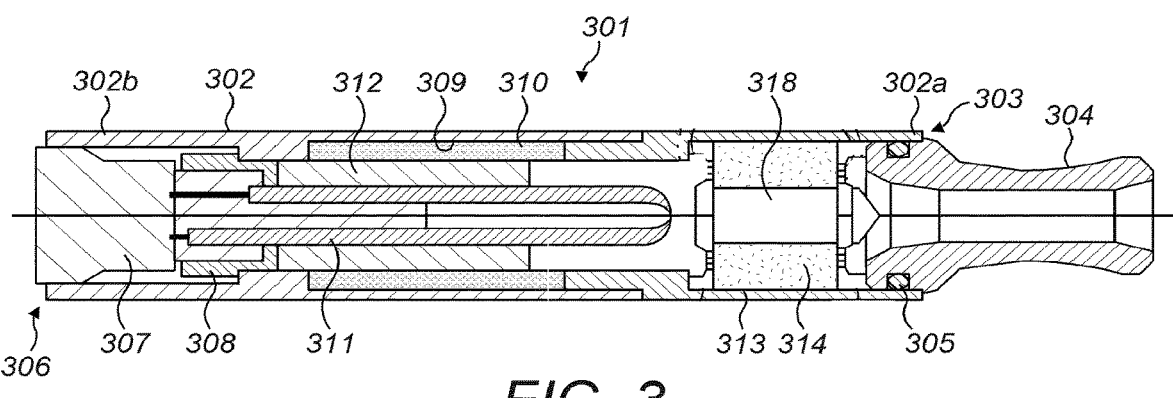
FIG. 3 shows a schematic longitudinal cross-sectional view of another example of a device for generating an inhalable medium.

Referring now to FIG. 3, there is shown another example of a device for generating an inhalable medium. In the following description and in FIG. 3, components and features that are the same as or similar to the corresponding components and features of the example described with reference to FIG. 1 have the same reference numeral but increased by 300. For the sake of brevity, the description of those components and features will not be repeated in its entirety here. It will be understood that the arrangements and alternatives, etc. described above in relation to the examples of FIG. 1 and FIG. 2 are also applicable to the example of FIG. 3. Again, in broad outline, the device 301 of FIG. 3 heats a liquid to form a vapor or an aerosol which passes through a tobacco composition 314 so as to produce an inhalable medium that contains one or more constituents derived from the tobacco composition.

The device 301 of this example again has a generally hollow cylindrical outer housing 302 with an open end 303 and a tubular mouthpiece 304, which is removable by a user from the housing 302. O-ring or other seal 305 assists in sealing the mouthpiece 304 in the housing 302. A battery 307 for powering various components of the device 301 and a controller 308 are provided at or towards the other end 306 of the housing 302. The housing 302 of this example is again in two parts, a first part 302a being towards the open end 303 and a second part 302b towards the other end 306.

The housing 302 has a container 309 for holding or containing a liquid 310. The container 309 may be of any of the types described above in relation to the examples of FIGS. 1 and 2. A heater 311 is provided generally centrally of the housing 302 for heating the liquid 310. The heater 311 may be any of the types described above. In this example, the heater 311 is powered by the battery 307 and is therefore electrically connected to the battery 307. An annular wick 312 surrounds the heater 311 and is in (thermal) contact with the heater 311. The outermost surface of the annular wick 312 is in contact with liquid 310 contained in the liquid container 309. The liquid 310 may be heated so as to produce an aerosol of liquid droplets or sufficiently heated to produce a vapor. The aerosol or vapor so produced exits the wick 312 and passes towards the mouthpiece 304 as shown by the arrows A under the action of the user drawing on the mouthpiece 304. The heater 311 and wick 312 may be provided as a single, effectively integral item such that the heating and wicking is effectively carried out by a single unit.

The housing 302 further contain a chambers 313 which holds or contains a tobacco composition 314 in the device 301. The tobacco-contacting surfaces of the chamber 13 are formed from a copolyester plastic as discussed herein.

The chamber 313 may be of any of the types described above in relation to the examples of FIGS. 1 and 2. The tobacco composition 314 is located in the housing 302 downstream of the location where the aerosol or vapor is produced from the liquid 310 and upstream of the open end 303 of the housing 302 and the mouthpiece 304. In this particular example, again, the tobacco composition is effectively provided in the same portion or chamber of the housing 302 as the wick 312. The aerosol or vapor produced from the liquid 310 exits the wick 312 and passes as shown by the arrows A towards the tobacco composition under the action of the user drawing on the mouthpiece 304. In particular embodiments, the tobacco composition 314 is porous so that the aerosol or vapor passes through the tobacco composition and then through the open end 303 of the housing 302 and the mouthpiece 304. The heat carried by the aerosol or vapor volatilizes nicotine and other volatiles from the tobacco composition, which are then entrained in the passing vapor/aerosol.

In some embodiments, the tobacco composition and/or the chamber is arranged so that there is no air gap between the tobacco composition/chamber and the interior of the housing 302 so that the aerosol or vapor flows entirely through the tobacco composition. As the aerosol or vapor passes through and over the tobacco composition, the hot aerosol or vapor entrains organic and other compounds or constituents from the tobacco composition, thus imparting tobacco flavor to the aerosol or vapor as is passes to the mouthpiece 304. The container 309 for containing the liquid 310 may itself be arranged to support or carry the tobacco composition.

In the example device 301 of FIG. 3, a second heater 318 is again provided in thermal contact with the tobacco composition 314 to heat the tobacco composition to encourage release of constituents from the tobacco composition as the vapor or aerosol passes through the tobacco composition in use. The second heater 318 may be an electrically resistive heater, a ceramic heater, etc., powered by for example the battery 307. Other heating arrangements may be used for the second heater 318, including non-electrical heating arrangements.

In the example device 301 of FIG. 3, the heater 318 for heating the tobacco composition 314 is provided internally of the tobacco composition and heats the tobacco composition by heat conduction from the interior of the tobacco composition. The heater 318 in this example is generally in the form of a cylindrical rod located along the central longitudinal axis of the tobacco composition. In other arrangements, the heater 318 may be a wire, which may for example be in the form of a coil, a plate (which may be a multi-layer plate of two or more different materials, one or more of which may be electrically conductive and one or more of which may be electrically non-conductive), a mesh (which may be woven or non-woven for example, and which again may be similarly multi-layer), a film heater, etc. The tobacco composition in this case is generally tubular or otherwise has an internal aperture for receiving the heater 318. The heater 318 may in effect be an integral part of the device 301 and be provided as part of the housing 302. In this case, as the tobacco composition 314 are loaded into the device 301 (for example, as the chamber 313 containing the tobacco composition is loaded into the device 301), the tobacco composition surrounds the second heater 318. As an alternative, the heater 318 may be provided integrally with the chamber 313. In this alternative, in the case that the chamber is disposable, the heater 318 will be replaced when a new chamber with fresh tobacco is loaded into the device 301 by the user.

In another example, plural internal heaters 318 may be provided, so as to provide for more efficient heating of the tobacco composition. In another example, the tobacco composition may be heated by both one or more external heaters (like the second heater 215 of the example of FIG. 2) and by one or more internal heaters (like the second heater 318 of the example of FIG. 3).

The one or more heaters 318 configured to heat the tobacco composition may volatilize nicotine or other volatiles from the tobacco composition.

Referring now to FIG. 4, there is shown a schematic longitudinal cross-sectional view of an example of a cartridge 600 having a liquid container 601 for containing liquid 602 and container 603 for a tobacco compositions 604. In this example, the liquid container 601 and the tobacco composition container 603 are provided as one integral component, either by being formed integrally initially or being formed initially of two parts which are then assembled in a substantially permanent fashion. The cartridge 600 is arranged so that as the liquid 602 is volatilized so as to produce an aerosol of liquid droplets or sufficiently heated to produce a vapor, at least some and preferably all or substantially all of the aerosol or vapor passes through the tobacco composition 604 to pick up flavor from the tobacco composition.

In the example of FIG. 4, the liquid container 601 is provided generally centrally of the cartridge 600. The liquid container 601 in the example shown is frustoconical in shape, but may have a different shape, such as conical, cylindrical, etc. The liquid container 601 is surrounded by an outer shell 605 which defines an annular channel 606 around the outside of the length of the liquid container 601 and which extends from one end of the liquid container 601 to the other. The outer shell 605 extends beyond a first end wall 607 of the liquid container 601 to define a chamber 608 beyond the first end wall 607 of the liquid container 601. The annular channel 606 and the chamber 608 form a container 603 containing the tobacco composition 604. In other examples, the tobacco composition may be provided only in the chamber 608, and the annular channel 606 is empty. The chamber 608 is closed off by an end wall 609 which is spaced from the end wall 607 of the liquid container 601. The end wall 609 may be part of the outer shell 605 or may be a separate plastics or rubber cap or the like. In yet other examples, the tobacco composition is provided in the channel 606 and there is no material in the chamber 608, and indeed the chamber 608 may be omitted and the channel 606 effectively terminates at the end wall 609. The channel 606 and/or chamber 608 may be entirely filled with the tobacco composition or may only contain a portion or plug of material. The end wall 609 is porous and/or has one or more through holes 610 to enable the aerosol or vapor to exit the cartridge 600 to be inhaled by a user. The liquid container 601 and the solid chamber 603 may each be formed of rigid, watertight and airtight materials, such as metal, suitable plastics, etc. At least a portion of the tobacco-contacting surfaces of the chamber 603 (including surfaces in channel 606 and/or chamber 608 as appropriate), may comprise (or consist of) a copolyester plastic as discussed herein. In some cases, all tobacco-contacting surfaces may comprise of consist of the copolyester plastic discussed herein.

The example cartridge 600 shown in FIG. 4 is provided with a heater 611 and a wick 612 in (thermal) contact with the heater 611. In this example, the heater 611 and the wick 612 are provided as a single unit, often referred to as an "atomizer". In this case, where the cartridge 600 includes an atomizer, such a cartridge is often referred to as a "cartomizer". The orientation of the heater 611 is shown schematically and for example the heater 611 may be a coil having its longitudinal axis perpendicular to the longitudinal axis of the cartridge 600 rather than parallel as shown in FIG. 4.

The wick 612 is in contact with the liquid 602. This may be achieved by for example the wick 612 being inserted through a through hole (not shown) in the second end wall 613 of the liquid container 601. Alternatively or additionally, the second end wall 613 may be a porous member (shown schematically in FIG. 4 by dashed lines) which allows liquid to pass through from the liquid container 601, and the wick 612 may be in contact with the porous second end wall 613.

The second end wall 613 may be for example in the form of a porous ceramic disk. A porous second end wall 613 of this type helps to regulate the flow of liquid onto the wick 612. The wick 612 is generally absorbent and acts to draw in liquid 602 from the liquid container 601 by capillary action. The wick 612 is preferably non-woven and may be for example a cotton or wool material or the like, or a synthetic material, including for example polyester, nylon, viscose, polypropylene or the like.

In use, the cartridge 600 is connected by the user to a battery section of a device (not shown) to enable the heater 611 to be powered. When the heater 611 of the atomizer is powered (which may be instigated for example by the user operating a button of the overall device or by a puff detector of the overall device, as is known per se), liquid 602 drawn in from the liquid container 601 by the wick 612 is heated by the heater 611 to volatilize or vaporize the liquid. As the user draws on a mouthpiece of the overall device, the vapor or aerosol passes into the annular channel 606 around the outside of the length of the liquid container 601 and into the chamber 608 as shown by the arrows A. The vapor or aerosol picks up flavor from the tobacco composition 604.

The heat carried by the aerosol or vapor volatilizes nicotine and other volatiles from the tobacco composition, and these are then entrained in the passing vapor/aerosol. The vapor or aerosol can then exit the cartridge 600 through the end wall 609 as shown by the arrow B. Optionally, a one way valve 614 may be provided inside the end wall 609 so that the vapor or aerosol can only exit the cartridge 600 and cannot back-flow to the heater 611 or the electronics of the device as a whole.

Referring now to FIG. 5, there is shown a schematic longitudinal cross-sectional view of another example of a cartridge 700 having a liquid container 701 for containing liquid 702 and a container 703 within a chamber 708. The container holds a tobacco composition 704. In the following description and in FIG. 5, components and features that are the same as or similar to the corresponding components and features of the example described with reference to FIG. 4 have the same reference numeral but increased by 100. For the sake of brevity, the description of those components and features will not be repeated in its entirety here.

In this example, the liquid container 701 and the tobacco composition container 703 of the cartridge 700 are provided as separate components, which are detachably connected to each other in use. The liquid container 701 and the tobacco composition container 703 may for example be clipped or otherwise detachably fixed to each other, or for example the tobacco composition container may simply rest on or be a tight friction fit on the liquid container 701. The cartridge 700 is arranged so that as the liquid 702 is volatilized so as to produce an aerosol of liquid droplets or sufficiently heated to produce a vapor, at least some and preferably all or substantially all of the aerosol or vapor passes through the tobacco composition 704 to pick up flavor from the tobacco composition.

In this example, the liquid container 701 is surrounded by an outer shell 705 which defines an annular channel 706 around the outside of the length of the liquid container 701 and which extends from one end of the liquid container 701 to the other. The outer shell 705 extends beyond a first end wall 707 of the liquid container 701 and terminates in an end wall 709. The end wall 709 may be a separate plastics or rubber cap or the like. The end wall 709 is porous and/or has one or more through holes 710 to enable the aerosol or vapor to exit the annular channel 706. A one way valve 714 may be provided inside the end wall 709 so that the vapor or aerosol can only exit the annular channel 706 at the end remote from the heater 711 and wick 712 and cannot back-flow to the heater 711 or the electronics of the device as a whole. The tobacco composition container 703 is located in use over the end wall 709 so that vapor or aerosol exiting through the end wall 709 passes into the tobacco composition container. The tobacco composition container has have an exit aperture and/or or a porous end wall 715 to enable the aerosol or vapor to exit the cartridge 700 to be inhaled by a user.

In use, the cartridge 700 is connected by the user to a battery section of a device (not shown) to enable the heater 711 to be powered. When the heater 711 of the atomizer is powered (which may be instigated for example by the user operating a button of the overall device or by a puff detector of the overall device as is known per se), liquid 702 drawn in from the liquid container 701 through the end wall 713 by the wick 712 is heated by the heater 711 to volatilize or vaporize the liquid. As the user draws on a mouthpiece of the overall device, the vapor or aerosol passes into the annular channel 706 around the outside of the length of the liquid container 701 towards the end wall 709 of the outer shell 705 as shown by the arrows A. The vapor or aerosol then passes through the end wall 709 (via the one-way valve 714 if present) and into the tobacco composition container 703 where it picks up flavor from the tobacco composition 704. Heat carried by the aerosol or vapor volatilizes nicotine or other volatiles from the tobacco compositions, which are then entrained in the passing vapor/aerosol. The vapor or aerosol can then exit the cartridge 700 through the end wall 715 of the tobacco composition containers as shown by the arrow B.

The examples shown in FIGS. 4 and 5 are particularly suitable for use with so-called modular or "e-go" products, in which the cartomizer is fitted to a battery section (not shown), typically by a screw thread, a bayonet fitting or the like. The cartomizer as a whole is typically discarded after use and a new, replacement cartomizer used. As an alternative, it may be possible for the user to re-use the cartridge by refilling the liquid and/or replacing the solid material from time to time as necessary.

The examples shown in FIGS. 4 and 5 may easily be adapted for use with other types of an electronic tobacco hybrid device, which are known per se. There are for example so-called "look alike e-cigarette" or "cig-alike" devices which are generally small and have a form and appearance similar to a conventional cigarette. In such devices, the liquid container typically includes some wadding material, of for example cotton or the like, for holding the liquid. The cartridge or cartomizer in such known devices is typically disposable as a whole, but it may be possible to refill the liquid and/or replace the solid material in examples that use an embodiment of the present disclosure. As another example, there are so-called tank devices or personal vaporizers which generally have large liquid containers for holding relatively large volumes of liquid and also provide for advanced functions that allow users to control a number of aspects of the device.

As an alternative to any of the cartomizer arrangements discussed above, the atomizer (i.e. the heater and the wick) for the liquid may be provided separately of the liquid and material containers. The atomizer may for example be provided as part of the battery section of the overall device to which the cartridge is detachably fitted by the user in use.

In any of the examples described above in relation to FIGS. 4 and 5, there may also be provided a heater for the tobacco composition so as to "pre-heat" it. This heater may be provided as part of the cartridge or as part of the battery section of the device to which the cartridge is fitted in use. This heater for the tobacco composition volatilizes nicotine and other volatiles present in the tobacco composition, which are then entrained in the passing vapor/aerosol.

EXAMPLE

In one example, a tobacco blend at pH 9.5 was placed in a tobacco container formed from TX1501 (Tritan polymer available from Eastman Chemical Company). TX1501 is an example of a BPA-free, BPS free copolyester plastic, formed from di-methylterephthalate (DMT), 1,4-cyclohexanedimethanol (CHDM) and 2,2,4,4-tetramethyl-1,3-cyclobutanediol (TMCD).

The container was stored at 40° C. and 75% relative humidity for 12 weeks (conditions selected as an accelerated aging process to evaluate product stability over time).

A comparative test was completed using a polypropylene container known in the art (using the same blend and storing under the same conditions).

Figure 6:
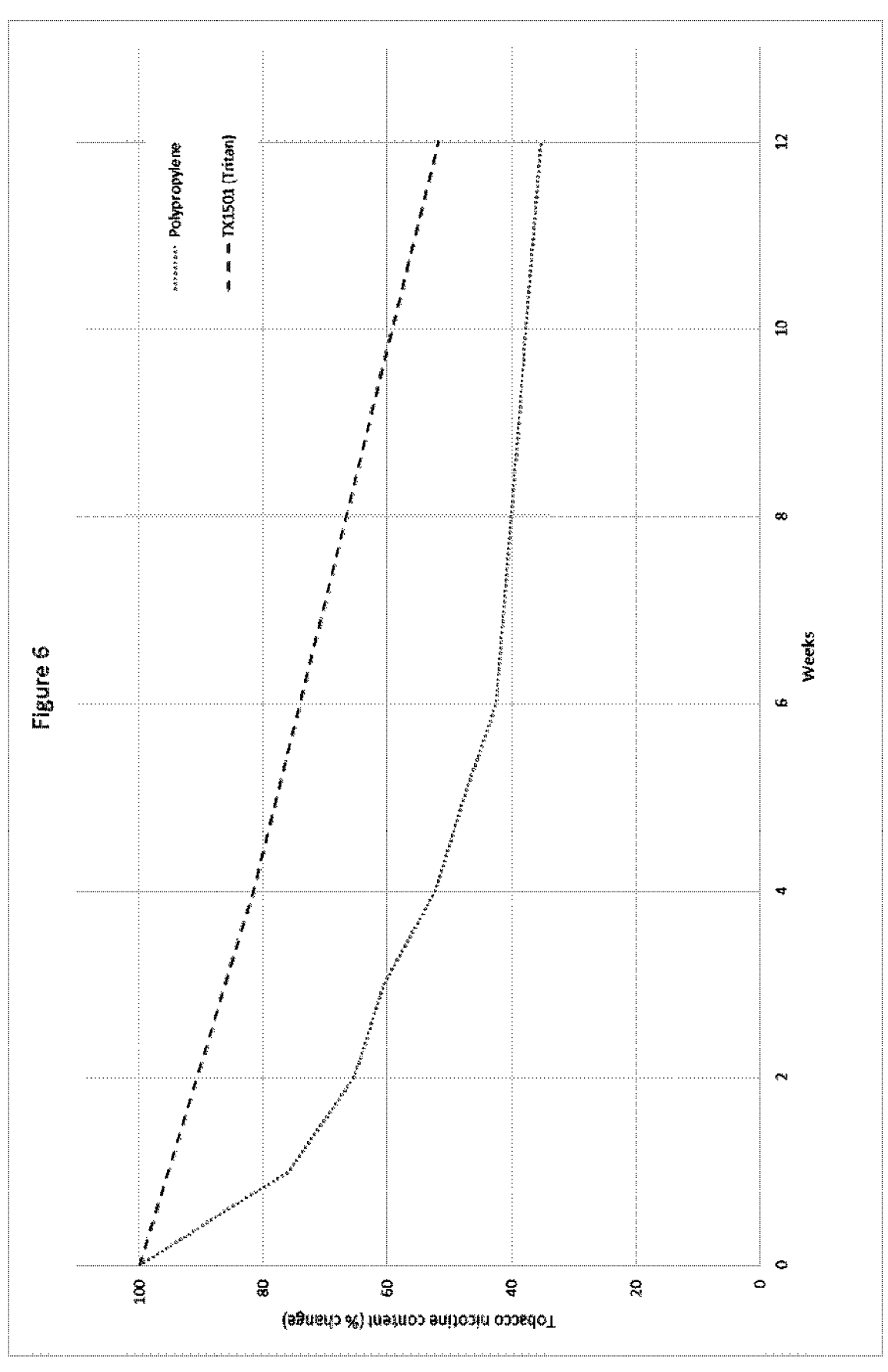
FIG. 6 shows nicotine losses from a tobacco material stored in a container according to an embodiment of the disclosure and a comparative container.

The nicotine losses from the tobacco blend were measured at various points in the aging process and are illustrated in FIG. 6. As can be seen, the total nicotine losses from the tobacco stored in the Tritan container were less than the losses from tobacco stored in the polypropylene container throughout the 12 week period.

Figure 7:
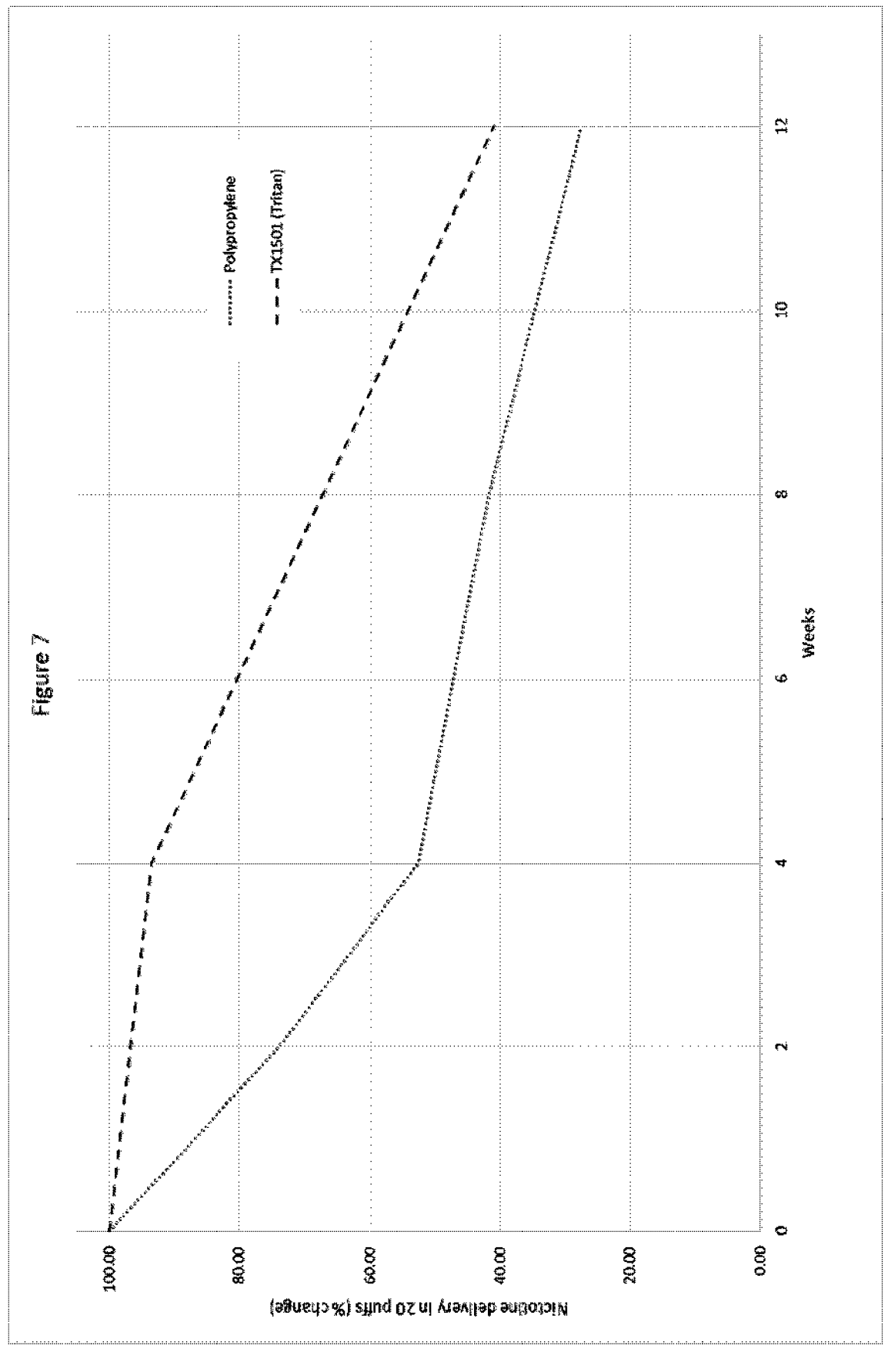
FIG. 7 shows nicotine delivery from a tobacco material stored in a container according to an embodiment of the disclosure and a comparative container.

Nicotine delivery in the aerosol was also evaluated at various points in the aging process. The tobacco containers were inserted into a device as illustrated in FIG. 1 and the total nicotine content of the aerosol delivered in the first twenty puffs was measured (under a simulated puffing regime of a 3 second puff every thirty seconds, under an airflow of 1.10 L/min (i.e. 55 mL puff volume), beginning once the device had reached operating temperature). The results are shown in FIG. 7, where it can be seen that nicotine delivery from the Tritan container was greater than the polypropylene container throughout the 12 week period.

Definitions

As used herein, "resistance to draw" refers to the pressure required to force air through the full length of the object under test at the rate of 17.5 milliliters per second at 22 degrees Celsius and 101 kilopascals (760 Torr). Resistance to draw is measured in accordance with ISO 6565:201 1.

As used herein, a tobacco pH is measured according to CORESTA protocol number 69.

As used herein, "aerosol generating agent" refers to a compound or mixture that promotes the generation of an aerosol. An aerosol generating agent may promote the generation of an aerosol by promoting an initial vaporization and/or the condensation of a gas to an inhalable solid and/or liquid aerosol.

In general, any suitable aerosol generating agent or agents may be included in the aerosol generating material of the disclosure. Suitable aerosol generating agents include, but are not limited to: a polyol such as sorbitol, glycerol, and glycols like propylene glycol or triethylene glycol; a non-polyol such as monohydric alcohols, high boiling point hydrocarbons, acids such as lactic acid, glycerol derivatives, esters such as diacetin, triacetin, triethylene glycol diacetate, triethyl citrate or myristates including ethyl myristate and isopropyl myristate and aliphatic carboxylic acid esters such as methyl stearate, dimethyl dodecanedioate and dimethyl tetradecanedioate.

As used herein, the terms "flavor" and "flavoring" refer to materials which, where local regulations permit, may be used to create a desired taste or aroma in a product for adult consumers. They may include extracts (e.g., liquorice, hydrangea, Japanese white bark magnolia leaf, chamomile, fenugreek, clove, menthol, Japanese mint, aniseed, cinnamon, herb, wintergreen, cherry, berry, peach, apple, Drambuie, bourbon, scotch, whiskey, spearmint, peppermint, lavender, cardamom, celery, cascarilla, nutmeg, sandalwood, bergamot, geranium, honey essence, rose oil, vanilla, lemon oil, orange oil, cassia, caraway, cognac, jasmine, ylang-ylang, sage, fennel, piment, ginger, anise, coriander, coffee, or a mint oil from any species of the genus Mentha), flavor enhancers, bitterness receptor site blockers, sensorial receptor site activators or stimulators, sugars and/or sugar substitutes (e.g., sucralose, acesulfame potassium, aspartame, saccharine, cyclamates, lactose, sucrose, glucose, fructose, sorbitol, or mannitol), and other additives such as charcoal, chlorophyll, minerals, botanicals, or breath freshening agents. They may be imitation, synthetic or natural ingredients or blends thereof. They may be in any suitable form, for example, oil, liquid, or powder.

For the avoidance of doubt, where in this specification the term "comprises" is used in defining the invention or features of the invention, embodiments are also disclosed in which the invention or feature can be defined using the terms "consists essentially of" or "consists of" in place of "comprises".

For the avoidance of doubt, where in this specification the terms "first" and "second" are used to refer to materials/container/chambers, there is no implicit disclosure of any order of use. "First" and "second" are simply used as a tool for referencing different compositions or chambers. Features discussed in relation to one chamber or composition are explicitly disclosed in relation to each chamber or composition, as appropriate.

The above embodiments are to be understood as illustrative examples of the invention. Further embodiments of the invention are envisaged. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

The various embodiments described herein are presented only to assist in understanding and teaching the claimed features. These embodiments are provided as a representative sample of embodiments only, and are not exhaustive and/or exclusive. It is to be understood that advantages, embodiments, examples, functions, features, structures, and/or other aspects described herein are not to be considered limitations on the scope of the invention as defined by the claims or limitations on equivalents to the claims, and that other embodiments may be utilized and modifications may be made without departing from the scope of the claimed invention. Various embodiments of the invention may suitably comprise, consist of, or consist essentially of, appropriate combinations of the disclosed elements, components, features, parts, steps, means, etc., other than those specifically described herein. In addition, this disclosure may include other inventions not presently claimed, but which may be claimed in future.

The invention claimed is:

1. A device for generating an inhalable medium, the device comprising:
   a container for holding a first aerosolizable material;
   a heater for volatilizing the first aerosolizable material held in the container;
   a chamber for holding a second aerosolizable material comprising nicotine, wherein internal surfaces of the chamber comprise a Bisphenol A (BPA)-free, Bisphenol S (BPS)-free copolyester plastic, the copolyester plastic being configured to minimize nicotine losses from the second aerosolizable material; and
   an outlet;
   wherein the device is configured such that in use, the inhalable medium is generated and passes through the outlet, the inhalable medium comprising components of the first and second aerosolizable materials in the form of a vapor and/or an aerosol.

2. The device according to claim 1, wherein the internal surfaces of the chamber are formed from the BPA-free, BPS-free copolyester plastic.

3. The device according to claim 2, wherein the BPA-free, BPS-free copolyester plastic is formed from;
   di-methylterephthalate (DMT);
   1, 4-cyclohexanedimethanol (CHDM); and
   2, 2, 4, 4-tetramethyl-1,3-cyclobutanediol (TMCD).

4. The device according to claim 1, wherein the device is configured such that in use, the first aerosolizable material is volatilized by the heater to form the vapor and/or the aerosol, which passes through the chamber containing the second aerosolizable material and entrains one or more constituents of the second aerosolizable material, thereby forming the inhalable medium which passes through the outlet.

5. The device according to claim 1, including the first aerosolizable material in the container and the second aerosolizable material in the chamber, wherein the first aerosolizable material comprises a liquid or a gel.

6. The device according to claim 1, including the first aerosolizable material in the container and the second aerosolizable material in the chamber, wherein the first aerosolizable material does not comprise nicotine.

7. The device according to claim 1, including the first aerosolizable material in the container and the second aerosolizable material in the chamber, wherein the second aerosolizable material comprises nicotine.

8. The device according to claim 1, including the first aerosolizable material in the container and the second aerosolizable material in the chamber, wherein the second aerosolizable material comprises tobacco having a pH of greater than 7.

9. The device according to claim 1, including the first aerosolizable material in the container and the second aerosolizable material in the chamber, wherein the first aerosolizable material comprises a liquid or a gel, wherein the first aerosolizable material does not comprise nicotine, wherein the second aerosolizable material comprises nicotine, and wherein the second aerosolizable material comprises tobacco having a pH of greater than 7.

10. The device according to claim 1, including the first aerosolizable material in the container and the second aerosolizable material in the chamber, wherein the first aerosolizable material comprises a liquid or a gel, and wherein the first aerosolizable material does not comprise nicotine.

11. The device according to claim 1, including the first aerosolizable material in the container and the second aerosolizable material in the chamber, wherein the second aerosolizable material comprises nicotine; and wherein the second aerosolizable material comprises tobacco having a pH of greater than 7.

12. A tobacco container for holding tobacco, the container comprising a chamber having internal surfaces, wherein the internal surfaces comprise a Bisphenol A (BPA)-free, Bisphenol S (BPS)-free copolyester plastic, the copolyester plastic being configured to minimize nicotine losses from aerosolizable material.

13. The tobacco container according to claim 12, wherein the internal surfaces of the chamber comprise a tobacco-contacting surface, wherein the tobacco-contacting surface comprises the BPA-free, BPS-free copolyester plastic.

14. The tobacco container according to claim 12, wherein the BPA-free, BPS-free copolyester plastic is formed from:
   di-methylterephthalate (DMT);
   1, 4-cyclohexanedimethanol (CHDM); and
   2, 2, 4, 4-tetramethyl-1,3-cyclobutanediol (TMCD).

15. The tobacco container according to claim 12, wherein the container is substantially formed from the BPA-free, BPS-free copolyester plastic.

16. The tobacco container according to claim 12, wherein tobacco is included in the container.

17. The tobacco container according to claim 16, wherein the tobacco has a pH of greater than 7.

18. A kit comprising
   (i) a liquid pod containing an aerosolizable liquid; and
   (ii) a tobacco container according to claim 16;

wherein the liquid pod and the tobacco container are configured for use in a device for use in generating an inhalable medium, the device being such that in use, the inhalable medium is generated, the inhalable medium comprising (i) volatilized liquid from the liquid pod in the form of a vapor and/or an aerosol and (ii) one or more constituents of the tobacco.

19. The tobacco container of claim 16, wherein the internal surfaces of the chamber comprise a tobacco-contacting surface and the tobacco-contacting surface reduces nicotine losses from the tobacco.

20. A cartridge for use in a device for generating an inhalable medium, the cartridge comprising:
   a first aerosolizable material in a container, and
   a second aerosolizable material in a chamber, wherein internal surfaces of the chamber comprise a Bisphenol A (BPA)-free, Bisphenol S (BPS)-free copolyester plastic, the copolyester plastic being configured to minimize nicotine losses from the second aerosolizable material.

21. The cartridge according to claim 20, wherein the cartridge is configured such that in use, a vapor and/or an aerosol formed by volatizing the first aerosolizable material passes through the chamber to thereby entrain one or more constituents from the second aerosolizable material to produce the inhalable medium.

* * * * *